J. H. AHRENS.
Saw-Set.

No. 219,891.      Patented Sept. 23, 1879.

WITNESSES:
Henry N. Miller
C. Sedgwick

INVENTOR:
J. H. Ahrens
BY Munn & Co.
ATTORNEYS.

UNITED STATES PATENT OFFICE.

JOHN H. AHRENS, OF OSWEGO, NEW YORK.

IMPROVEMENT IN SAW-SETS.

Specification forming part of Letters Patent No. 219,891, dated September 23, 1879; application filed May 14, 1879.

*To all whom it may concern:*

Be it known that I, JOHN HENRY AHRENS, of Oswego, in the county of Oswego and State of New York, have invented a new and useful Improvement in Saw-Sets, of which the following is a specification.

Figure 1:
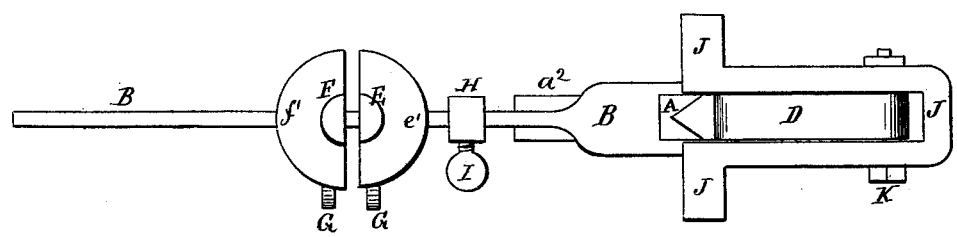
Figure 2:
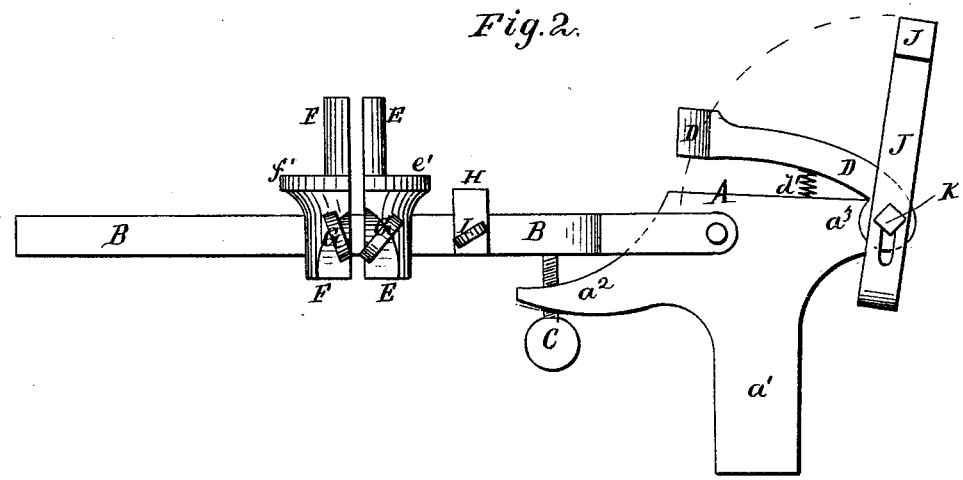

Figure 1 is a top view of my improved saw-set. Fig. 2 is a side view of the same.

Similar letters of reference indicate corresponding parts.

The object of this invention is to furnish an improved device for setting circular and other saws, which shall be so constructed that all the teeth will be set exactly alike, and will retain the set so that less filing and less setting will be required than when an ordinary saw-set is used.

The invention consists in the combination of the pivoted bar, the set-screw, and the two semi-cylindrical blocks provided with the shoulders and the set-screws with the anvil and the hammer, and in the combination of the adjustable block provided with the set-screw and the adjustable gage with the pivoted bar and its set-screw, the anvil, and the hammer, as hereinafter fully described.

A is the anvil, the shank $a^1$ of which is designed to be set in a block or secured in a vise. To the forward part of the anvil A is pivoted the end of a bar, B, which is supported upon a set-screw, C. The set-screw C passes up through a hole in the forward arm, $a^2$, of the anvil A, so that more or less set may be given to the teeth by turning the set-screw C down or up.

D is the hammer, which is pivoted to the rear arm, $a^3$, of the anvil A by a bolt, K. E F are two semi-cylindrical blocks, which have holes in their lower parts to receive the bar B, and are provided with set-screws G to secure them in place when adjusted. The blocks E F are placed upon the bar B with their flat sides toward each other, and have semicircular shoulders $e'$ $f'$ formed upon them for the circular saws to rest upon.

The circular saw to be set is placed upon the blocks E F with a tooth upon the anvil A, and is so adjusted that the tooth may project to the required distance upon the said anvil. The block E is then adjusted against the inner side of the eye of the saw, and is secured by its set-screw G, and the block F is adjusted against the outer side of the eye, and is secured by its set-screw G. The saw is now provided with a true center, which will bring every tooth to exactly the same position, so that they will all be set at exactly the same inclination.

The hammer D is brought down upon the teeth to give them the set by a blow struck upon the head of the said hammer D. The hammer D is raised from the teeth by a small spring, $d'$, interposed between the said hammer and the rear arm, $a^3$, of the anvil A.

H is a block for supporting the blades of straight saws. The block H is slotted to receive the bar B, and is secured in place when adjusted by a set-screw, I. The block H need not be removed from the bar B when circular saws are to be set.

J is a gage, which is slotted to receive the hammer D and the upper part of the anvil A, and is pivoted to the rear arm, $a^3$, of the said anvil by the bolt K, that pivots the hammer D to it. The gage J is slotted to receive the bolt K, so that it may be adjusted to allow the teeth of the saws to project to any desired distance upon the anvil A, and is secured in place when adjusted by tightening up the nut of the bolt K.

In setting the teeth of straight saws, they are placed upon the block H with their teeth resting against the gage J, so that the tooth to be operated upon can project for the required distance upon the anvil. When not required for use the gage J may be turned back, as shown in Fig. 2.

Having thus described my invention, I claim as new and desire to secure by Letters Patent—

1. The combination of the pivoted bar B, the set-screw C, and the two semi-cylindrical blocks E F, provided with the shoulders $e'$ $f'$ and the set screws G with the anvil A and the hammer D, substantially as herein shown and described.

2. The combination of the adjustable block H, provided with the set-screw I and the adjustable gage J, with the pivoted bar B, the set-screw C, the anvil A, and the hammer D, substantially as herein shown and described.

JOHN HENRY AHRENS.

Witnesses:
 JOS. LEVY,
 ALFRED LOVELACE.